US006121607A

United States Patent [19]

Whitehouse et al.

[11] Patent Number: 6,121,607

[45] Date of Patent: Sep. 19, 2000

[54] ION TRANSFER FROM MULTIPOLE ION GUIDES INTO MULTIPOLE ION GUIDES AND ION TRAPS

[75] Inventors: Craig M. Whitehouse, Branford; Erol Gulcicek, Cheshire, both of Conn.

[73] Assignee: Analytica of Branford, Inc., Branford, Conn.

[21] Appl. No.: 08/857,191

[22] Filed: May 15, 1997

Related U.S. Application Data

[60] Provisional application No. 60/017,619, May 14, 1996.

[51] Int. Cl.[7] .......... B01D 59/44; H01J 49/00

[52] U.S. Cl. .......... 250/288; 250/282

[58] Field of Search .......... 250/281, 292, 250/288, 282

[56] References Cited

U.S. PATENT DOCUMENTS

| | | | |
|---|---|---|---|
| 4,990,777 | 2/1991 | Hurst et al. | 250/292 |
| 5,179,278 | 1/1993 | Douglas | 250/292 |
| 5,291,016 | 3/1994 | Taya | 250/292 |
| 5,572,035 | 11/1996 | Franzen | 250/292 |
| 5,625,186 | 4/1997 | Frankervich et al. | 250/292 |
| 5,663,561 | 9/1997 | Franzen et al. | 250/288 |

*Primary Examiner*—Bruce C. Anderson
*Attorney, Agent, or Firm*—Levisohn, Lerner, Berger & Langsam

[57] ABSTRACT

A multipole ion guide is configured to improve the transmission efficiency of ions which traverse the length of one ion guide and enter either another multipole ion guide such as a quadrupole mass analyzer or a three dimensional ion trap. The ion transfer multipole ion guide radial dimensions are reduced such that the pole assembly and an appropriately shaped exit lens can be positioned within a portion of the internal space defined by the larger radius second multipole ion guide poles. Ions exiting the first ion guide of reduced size find themselves inside the second ion guide close to the centerline. In this manner ions can be efficiently transferred from one ion guide to another, even for those ions with low kinetic energies. In a second embodiment of the invention, the exit region of a multipole ion guide is configured such that the multipole ion guide poles can be extended into a counterbore of a three dimensional ion trap end cap electrode. With this configuration, ions (including those with low kinetic energies) can be transferred into a three dimensional ion trap with increased trapping efficiency.

54 Claims, 7 Drawing Sheets

ION TRANSFER FROM MULTIPOLE ION GUIDES INTO MULTIPOLE ION GUIDES AND ION TRAPS

RELATED APPLICATIONS

This application claims the priority of U.S. Provisional Patent Application Ser. No. 60/017,619, filed May 14, 1996.

FIELD OF INVENTION

The present invention relates to an apparatus and method for increasing the efficiency of ion transport from ion sources into a multipole ion guide, a quadrupole mass analyzer or a three dimensional ion trap. Multipole ion guides have been effectively used to capture and transport ions which are delivered into vacuum from Atmospheric Pressure Ion (API) sources such as Electrospray (ES) and Atmospheric Pressure Chemical Ionization (APCI). Ions whose mass to charge (m/z) values fall within the stability region of the multipole ion guide are transmitted through the length of the guide and delivered to the entrance region of a mass analyzer. Specifically, the present invention addresses the ion transfer from a multipole ion guide into either a subsequent multipole ion guide such as a quadrupole mass analyzer or a three dimensional ion guide mass analyzer. Atmospheric Pressure Ion Source mass spectrometry (API-MS) has emerged as a sensitive method for detecting sample ion solutions with both discrete sample and on-line sample introduction methods. The invention improves performance with quadrupole mass and ion trap mass spectrometers for both on-line and off-line applications. In addition, the apparatus and methods described can be configured to improve quadrupole and ion trap mass analysis performance with ion sources other than API sources.

BACKGROUND OF INVENTION

Multipole ion guides have been used to efficiently transfer ions through vacuum or partial vacuum into mass analyzers. In particular, multipole ion guides have been configured to transport ions from an Atmospheric Pressure Ion (API) Source through one or more vacuum pumping stages and into a mass analyzer. Quadrupole, magnetic sector, Fourier Transform (FTMS), three dimensional ion trap and Time-Of-Flight (TOF) mass analyzers each have different entrance ion optics criteria which must be satisfied by any ion source ion transport or focusing system. The present invention addresses optimization of the transfer of ions from one multipole ion guide into a subsequent multipole ion guide, quadrupole mass analyzer or a three dimensional quadrupole ion trap. Multipole ion guides and ion traps operate with sinusoidal voltages and separate or combined DC voltages applied to one or more electrodes. The sinusoidal voltage wave forms are usually referred to as AC or RF because the frequency of these wave forms generally fall within the radio frequency range. The combination of AC and DC voltages applied to the rods of a multipole ion guide or the endcaps and ring electrode of a three dimensional quadrupole ion trap can be selected to establish stable ion trajectories for some mass to charge (m/z) values while rejecting others. Mass selection for mass analysis can be achieved in this manner, or ions can be trapped while colliding with background gas to achieve Collisional Induced Dissociation (CID) ion fragments from trapped ions or from ions traversing the length of the ion guide. Ions whose m/z values do not have a stable trajectory for the AC and DC potentials applied to the rods of a multipole ion guide will be rejected from the ion guide before reaching the ion guide exit. The AC and DC voltages applied to the poles of a multipole ion guide can be selected to achieve the functions of selective m/z ion transmission and ion rejection for those ions within the ion guide; however, the fields created by the applied voltages can pose some difficulty for ions trying to enter the ion guide. AC and DC voltages applied to the poles of a commercial analytical quadrupole can reach hundreds of volts and even kilovolt potentials. Similarly, the trajectories of ions attempting to enter a three dimensional quadrupole ion trap are greatly influenced by the RF fields produced from voltages applied to the ring electrode appearing at the ion guide endcap entrance orifice. Ion transport into a multipole ion guide will be considered first.

For a geometrically ideal multipole ion guide, there is no net electric field at the very centerline of the ion guide except for the common DC offset potential applied equally to all ion guide poles. Ions of a given polarity attempting to enter a device whose electrodes have an AC voltage applied can encounter a retarding or rejecting electric field gradient during a portion of the AC voltage phase. Multipole ion guides with an even number of symmetrically spaced parallel poles or rods ideally have no net AC (or RF) field at the centerline or axis of the assembly. Ion beams, however, have a finite cross section and most ions will enter a multipole ion guide such as a quadrupole mass analyzer at some radial distance off the centerline. Consequently, the trajectory of these ions will be influenced by an AC and an asymmetric DC field. Depending on the phase of the AC field, the asymmetric DC field off the centerline and the ion kinetic energy in the axial direction, an approaching ion may successfully enter the ion guide and maintain a stable trajectory, or may be rejected from entering the multipole ion guide or may enter the ion guide with an unstable trajectory. The more time an ion spends in the fringing fields while attempting to enter a multipole ion guide, the more cycles of AC voltage it can be exposed to and thus the more likely that it may be potentially driven into an unfavorable trajectory. For a given average ion energy, the higher an ion m/z value, the lower its velocity. Consequently, the larger the m/z value of an ion, the more time an ion will spend traversing the entrance region of a multipole ion guide while entering the rod assembly. Similarly, if the average ion kinetic energy is reduced, ions of a given m/z value will spend more time traversing the fringing fields of the multipole ion guide as they enter the ion guide. The AC voltages applied to the rods of a multipole ion guide with an even number of poles generally have equal RF amplitude but opposite phase for each adjacent rod or pole. For example, the opposing rods of a quadrupole ion guide have the same phase, which is itself 180 degrees out of phase from the AC voltage applied to each neighboring rod or pole.

One means used to achieve quadrupole mass analyzer m/z selection, is to apply RF and positive and negative polarity DC voltage to the rods with a selected RF to DC amplitude ratio. The DC voltage is equal in amplitude but opposite in polarity on adjacent rods. When quadrupole mass analyzers are scanned in this mass selective mode to acquire a mass spectrum, the AC and DC amplitudes increase proportionally with selected m/z during a scan. Consequently, an ion with a higher m/z value and a slower velocity than a lower m/z value, moves more slowly through the entrance fringing fields and must traverse a higher AC and DC fringing field amplitude in entering the quadrupole in scan mode. Ion transmission efficiency in quadrupole mass analyzers can decrease with increasing m/z, due in part to a decreased efficiency of ions entering the quadrupole. The positive and negative DC voltage components may be added to form a common offset voltage. This DC offset potential can be set to aid in accelerating ions into the quadrupole. In some applications, an additional low amplitude AC wave form, which has a lower frequency than the RF voltage component, is capacitively added to the RF voltage. This additional low amplitude AC voltage of a selected frequency or frequency set is added to the RF voltage to provide resonant frequency excitation for specific ion m/z rejection or fragmentation. With the exception of the DC offset voltage component, the effective AC and DC field strength decreases the closer an ion is positioned to the ion guide centerline. The invention improves the ion transport into a multipole ion guide such as a quadrupole mass analyzer by minimizing the fringing field effects and insuring that ions are delivered close to the multipole ion guide centerline with angular trajectories within the acceptance window of the multipole ion guide.

A quadrupole is the most commonly used multipole ion guide configuration for conducting mass analysis. Quadrupoles can achieve higher mass to charge resolving power compared with hexapoles, octapoles or ion guides with higher numbers of poles. Hexapoles or octapoles have been used in AC or RF only operating mode where ion transport with little or no m/z selection is desired. Hexapoles or octapoles may be used as the ion guide in which Collision Induced Dissociation occurs in what is generically referred to as a triple "quadrupole" mass spectrometer. Although the invention can be applied to improve the ion transfer efficiency into any multipole ion guide configured and used in RF only mode, as an ion trap, as a CID region or as a mass filter, a quadrupole will be described as an example. As was described above, ion losses can occur in the entrance region when transferring ions into a quadrupole ion guide or mass analyzers due to the electric fields which influence the ion trajectories as they approach and enter the quadrupole ion guide.

Peter H. Dawson (Chapter 2, Quadrupole Mass Spectrometry and Its Applications, Elsevier Scientific Publishing Company, New York, 1976) describes the effective quadrupole mass filter aperture and acceptance for an ion approaching the quadrupole entrance with both AC and DC electric fields applied to the poles. The effective entrance aperture through which ions may enter the quadrupole decreases with increasing resolution, increasing distance from the centerline, and trajectories with increasing off-axis angle and velocity. The success of an ion attempting to enter the quadrupole ion guide at a position off the centerline will be highly dependent on the phase and amplitude of the AC voltage component and the amplitude of the DC voltage component of the applied electric fields. In addition, ions approaching the quadrupole entrance can enter unstable trajectories due to fringing field affects. The more time an ion spends in the quadrupole fringing fields the more chance it has of being driven into an unstable trajectory. Once an ion establishes a stable trajectory in the ion guide, the more RF cycles the ion is exposed to while traversing the quadrupole length, and the higher the mass selection resolution that is achievable. This relationship between maximum resolution achievable as function of the number of RF cycles an ion is exposed to while traversing the length of a quadrupole can be expressed by the empirical relation, $$M/\Delta M=(1/K)N^n$$

(Chapter 6, Dawson).

$\Delta M$ is the mass spectral peak width at mass to charge value M for a singly charged ion. N is the number of cycles of the RF field and n and K are constants equal to approximately 2 and 20 respectively. An ion entering with lower axial velocity or energy will be exposed to more RF cycles during the time it spends in the quadrupole than an ion with higher energy. An ion with lower kinetic energy will also spend more time in the fringing fields at the quadrupole entrance and consequently have an increased chance of being driven into an unfavorable trajectory. Various lens configurations have been developed which attempt to overcome these opposing ion entrance and mass analysis criteria to achieve improved quadruple sensitivity and resolution performance. Ideally, it is desirable to introduce ions into a quadrupole ion guide with trajectories parallel to the centerline, with a minimum radial displacement and with a low ion energy.

When transferring ions from one multipole ion guide to another multipole ion guide, as occurs in triple "quadrupole" mass analyzers, losses can occur in the interface regions between each multipole ion guide. Commercial triple quadrupole instrument, typically have one or more electrostatic lenses located between two sequential ion guides and are configured not only to minimize the fringing electric fields at the entrance of the downstream ion guide but also to minimize the fringing fields at the exit end of the upstream ion guide. An electrostatic lens element is commonly used at the entrance of a multipole ion guide operated as either a mass analyzer or a Collisionally Induced Dissociation (CID) ion transport region. Commercially available multipole ion guide electrostatic entrance optics have included a flat plate entrance lens with an orifice positioned on the centerline which is located as close as possible along the axis to the entrance face of the multipole ion guide rods to minimize fringing effects. A second commercially available lens, known as a Turner-Kruger lens, has a ground or fixed DC potential entrance face with a tube section projecting into the quadrupole rod assembly. DC voltage is applied to a concentrically positioned inner tube and the DC voltage amplitude is varied proportional to the scanned quadrupole AC and DC voltages during a mass spectrum acquisition. A third commercially available electrostatic entrance lens assembly incorporates the use of a "leaky" dielectric material to reduce the quadrupole entrance fringing field effects. A cylindrical lens of semiconductor material is positioned to extend into the entrance region of a quadrupole rod assembly. The "leaky" dielectric semiconductor material is positioned to reduce the amplitude of the fringing fields experienced by ions entering the quadrupole assembly. Configurations of one or more flat plate electrostatic lens are commonly used to transfer ions from one multipole ion guide to another. The flat plate lenses are positioned in close proximity to the exit rod face of one multipole ion guide and the entrance rod face of the next multipole ion guide to minimize exit and entrance fringing field effects. The orifice size in these flat plate electrostatic lenses is configured as an optimization of opposing criteria. The smaller the orifice size, the less the fringing field penetration will effect the trajectory of an approaching ion. A larger orifice is desired, however, to avoid interfering with the ion beam cross section and reducing sensitivity. AC only sections or Brubaker lenses have also been added to the entrance and even the exit ends of analytical quadrupoles to reduce the DC fringing field effects for ions entering and exiting the quadrupole. Electrostatic entrance lenses have been configured with Brubaker lenses in commercial quadrupole analyzers to improve the efficiency of ion transport into a multipole ion guide particularly at reduced ion energies.

Each of these multipole ion guide entrance lens configurations help to reduce the effect of fringing fields but have variable ion transfer efficiencies into the ion guide depending on ion energy, ion m/z value, ion angular divergence, the radial position of the ion from the centerline and the AC and DC voltages applied to the ion guide poles. For example, as the resolution is increased for a quadrupole mass analyzer, the radial and angular acceptance window for an ion entering the ion guide may decrease and hence contribute to a reduction in sensitivity during mass analysis. Electrostatic entrance lens configurations do not fully compensate for the variations in entrance conditions encountered with quadrupole ion guide mass analysis operation. The present invention improves the efficiency of ion transport into ion guides by overcoming several of the performance problems encountered when using electrostatic lens systems. The invention improves the efficiency of ion transport into a multipole ion guide by extending the rods of one multipole ion guide into the entrance region of the next multipole ion guide rod assembly. This nested multipole ion guide configuration effectively reduces fringing field losses observed with electrostatic entrance lens configurations.

A second embodiment of the invention improves the ion transfer efficiency from a multipole ion guide into a three dimensional quadrupole ion trap. In this second embodiment, a multipole ion guide of reduced radial dimensions is positioned such that the ion guide rods extend into a counterbore in the entrance end cap of a three dimensional ion trap. The bottom of the counterbore is configured to be the multipole ion guide exit lens or an additional electrostatic lens can be added between the ion guide exit and the end cap. Without the additional electrostatic lens, the end cap aperture at the counterbore bottom serves as the multipole ion guide exit aperture and the ion trap entrance aperture. A portion of the ions unable to enter the ion trap due to rejection by the RF fringing field phase may remain trapped by the ion guide exit region. When the changing ion trap AC phase allows ions to enter the trap by creating a more favorable electric field at the ion trap entrance aperture, the ion guide releases ions into the ion trap. The offset potential of the multipole ion guide can be reduced relative to the three dimensional ion trap end cap voltage to trap ions in the ion guide during ion trap mass analysis. For example if the ion kinetic energy is established by the ion guide DC offset potential, lowering this offset potential below the DC potential set on the ion trap entrance endcap will prevent ions from leaving the ion guide, effectively trapping the ions within the multipole ion guide rod assembly internal volume. The technique of trapping ions in a multipole ion guide using a separate ion guide exit lens potential and releasing ions into a three dimensional ion trap has been described by Douglas in U.S. Pat. No. 5,179,278. Douglas, however, does not teach the configuration of extending the rods of a multipole ion guide into a counterbore of a three dimensional ion trap endcap to improve the trapping efficiency by recapturing ions within the ion guide that have been rejected by the ion trap entrance orifice. The invention also allows the transfer of low energy ions into the three dimensional ion trap, which aids in increasing the trapping efficiency of ions once they enter the ion trap. Also, due to the sharing of the end cap aperture, ions can be efficiently transferred back into the multipole ion guide from the ion trap to achieve improved sensitivity as well as a variety of enhanced scan functions.

SUMMARY OF INVENTION

A multipole ion guide has been configured with a reduced diameter such that the ion guide with the appropriately shaped exit lens can be positioned inside a larger diameter multipole ion guide. Ions exiting the smaller multipole ion guide pass through the exit lens and are focused to the centerline already inside the larger ion guide. Since the ions leaving the exit lens aperture of the multipole ion guide with reduced dimensions are already inside the larger ion guide, high ion transfer efficiencies can be achieved even with ions having low axial translational energies. Improved mass analysis resolution at higher sensitivities can be achieved with this ion transfer optic when ions are transferred into a quadrupole mass analyzer. The smaller ion guide can be configured to extend continuously through more than one vacuum stages or reside entirely within one vacuum stage. The smaller ion guide can be configured to reside in a different vacuum stage than that of the downstream larger ion guide with the smaller ion guide exit lens serving as the vacuum partition. Alternatively, all multipole ion guides can be configured to reside in the same vacuum pumping stage.

In a second embodiment of the invention, a multipole ion guide with reduced radial dimensions is positioned such that the rods of the multipole ion guide extend into a counterbore of the entrance endcap of a three dimensional quadrupole ion trap. The entrance aperture in the ion trap endcap as serves as the multipole ion guide exit lens. During the ion trap filling cycle, a portion of the ions rejected from entering the entrance aperture of the three dimensional ion trap due to unfavorable RF phase electric fields can be retrapped by the multipole ion guide. Ions ejected out of the entrance endcap by the three dimensional ion trap during mass analysis scanning can also be retrapped by the multipole ion guide. To increase duty cycle and sensitivity, the ion trap endcap voltage can be set higher than the kinetic energy of the ions exiting the multipole ion guide to trap ions in the multipole ion guide during a three dimensional ion trap mass analysis cycle. The multipole ion guide rod potentials can be set to reduce the m/z stability window. In this manner, ions with undesirable m/z values can be ejected from the multipole ion guide and prevented from entering the three dimensional ion trap, thus reducing space charge effects in the ion trap. The multipole ion guide can be configured to extend continuously into more than one vacuum pumping stage.

BRIEF DESCRIPTION OF DRAWINGS

FIG. 5*b* shows the improved results acquired the ion guide entrance lens configuration of the present invention, as opposed to the results obtained from the prior art assembly which is shown in FIG. 5*a*.

DESCRIPTION OF THE INVENTION

Figure 1:
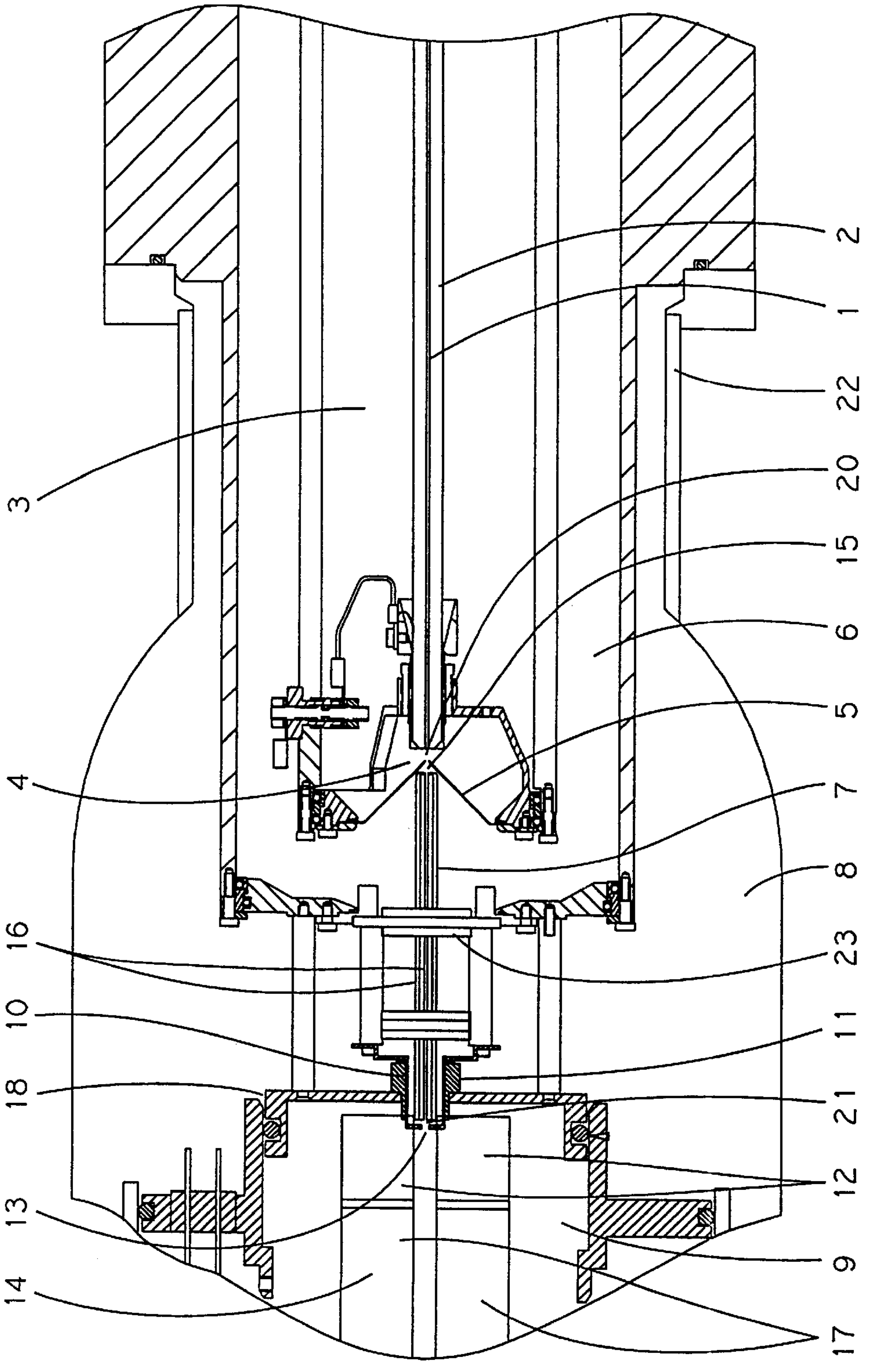
FIG. 1 is a drawing of a multipole ion guide configured to accept ions from an atmospheric pressure ion source and deliver them into a quadrupole mass analyzer through two vacuum pumping stages. The multipole ion guide and a portion of its exit lens extends into the inside diameter of the quadrupole mass analyzer rod assembly.

A preferred embodiment of the invention is shown in FIG. 1. A multipole ion guide is configured with a small radial diameter such that the ion guide and a surrounding hat shaped electrostatic exit lens element and insulator can fit within a larger multipole ion guide, in this case illustrated as a quadrupole mass analyzer. The hat shaped exit lens is surrounded by an electrically insulating material to prevent the exit lens from contacting and electrically shorting to the larger multipole ion guide rods. Ions exiting the smaller ion guide through its exit lens are focused to the centerline of the larger ion guide and efficiently trapped even at low ion kinetic energies. The multipole ion guide with reduced radial dimensions produces a very small diameter ion beam which enters the larger ion guide close to the centerline. Ions can exit the small ion guide at very low kinetic energies relative to the offset potential of the larger ion guide and are trapped in the radial direction by the RF of the large ion guide. Ions whose m/z values fall within the stability window set by the potentials applied to the larger multipole ion guide have trajectories which remain close to the centerline. Operation with the configuration shown in FIG. 1 results in high ion transport efficiencies from the smaller ion guide into the larger diameter ion guide even for low ion kinetic energies. The ability to efficiently transfer a low energy ion beam into a quadrupole mass analyzer with reduced m/z discrimination improves mass analysis performance. Significant improvements in sensitivity and resolution have been achieved with the configuration shown in FIG. 1 when compared with ion transfer through electrostatic lenses mounted external to the quadrupole rods. In the preferred embodiment shown, ions which are transferred from the smaller ion guide through the exit lens are already inside the quadrupole mass analyzer rod assembly close to the centerline with a minimum angular divergence. The effective radial trapping efficiency of the quadrupole is high for ion m/z values which fall within the stability window set by the potentials applied to the quadrupole rods.

FIG. 1 illustrates one embodiment for the vacuum ion optics region of an API source interfaced to a quadrupole mass analyzer. The API source can be but is not limited to an Electrospray (ES), Atmospheric Pressure Chemical Ionization (APCI) or an Inductively Coupled Plasma (ICP) source. Ions produced in the API source enter vacuum through orifice 1 in capillary tube 2.

The ions exit capillary 2 at exit end 4 and enter the first vacuum pumping stage 3. A portion of the ions pass through orifice 20 of skimmer 5 and enter multipole ion guide assembly 7 at its entrance 15. Multipole ion guide 7, as illustrated, extends continuously into multiple vacuum stages. This multiple vacuum stage multipole ion guide configuration efficiently transports ions passing through skimmer 5 orifice 20 into quadrupole mass analyzer 14 located in the fourth vacuum pumping stage 9. Multipole ion guide 7, as illustrated, is configured as a hexapole with rods 16, but could also be configured as a quadrupole or as a multipole ion guide with more than six poles. When AC only voltage with a common DC offset voltage is applied to multipole ion guide 7, a broad range of m/z values fall within the ion guide stability region and are transmitted from entrance 15 in the second vacuum pumping stage 6 to exit end 21 which is located in the third vacuum pumping stage 8 surrounded by vacuum housing 22. In the embodiment shown, the neutral gas pressure at the entrance 15 of ion guide 7 is high enough to cause collisional damping of the ion translational energies for those ions trapped by the AC or RF only field within ion guide 7. This collisional damping of ion kinetic energies effectively reduces the ion energy spread. Typically, ion beams with energy spreads of less than ±0.4 electron volts have been achieved for all m/z values transmitted, with the ion guide 7 configuration shown in FIG. 1.

The neutral gas is pumped away along the length of ion guide 7 through progressive vacuum stages 6, 8 and 9. Ions exiting ion guide 7 at exit lens 10 orifice 13 typically enter a background pressure in the $10^{-5}$ or $10^{-6}$ torr range or lower. The first vacuum stage 3 is typically evacuated by a rotary vacuum pump which maintains the background pressure in the range from 0.2 to 3 torr. Vacuum stage 6 background pressure can range from less than 1 millitorr to over 180 millitorr depending on the vacuum pump pumping speed and vacuum stage 8 generally is maintained in the $10^{-4}$ to $10^{-5}$ torr range. Vacuum stage 6 is separated from vacuum stage 8 by partition 23. Vacuum stage 8 is separated from vacuum stage 9 by partition 18 and ion guide exit lens 10. In the embodiment shown in FIG. 1 the average ion energy is set by the offset potential of ion guide 7 due to neutral gas collisional energy damping as the ions traverse the ion guide 7 length. Ions leaving exit end 21 of ion guide 7 pass through orifice 13 of the hat shaped exit lens 10 and into quadrupole 14 located in vacuum stage 9. For positive polarity ions, multipole ion guide 7 exit lens 10 voltage is set lower than the ion guide 7 offset potential to draw the ions out of ion guide 7 and focus them to the centerline of quadrupole mass analyzer 14. For example the ion guide 7 offset potential may be set at 0.5 volts and the ion guide exit lens 10 potential set at −5.0 volts to allow ion transfer with focusing into quadrupole 14. Voltage settings for negative ion transmission should have reverse polarities. Rods 17 of quadrupole assembly 14 are shown in cross section with the front two rods or poles 17 removed. Each quadrupole rod 17 has an AC only entrance end 12 or Brubaker lens attached. The offset or common DC potential applied to the AC only sections is set relative to the applied exit lens 10 voltage and the ion guide 7 offset potential to focus the ions exiting ion guide 7 to an optimal position along the quadrupole centerline. The AC component applied to the AC only sections 12 aids in moving ions which fall within the quadrupole stability region toward the centerline before entering the analytical portion of quadrupole mass analyzer 14. Ceramic insulator 11 prevents contact between exit lens 10 and poles 12 or vacuum partition 18 during operation.

Figure 2:
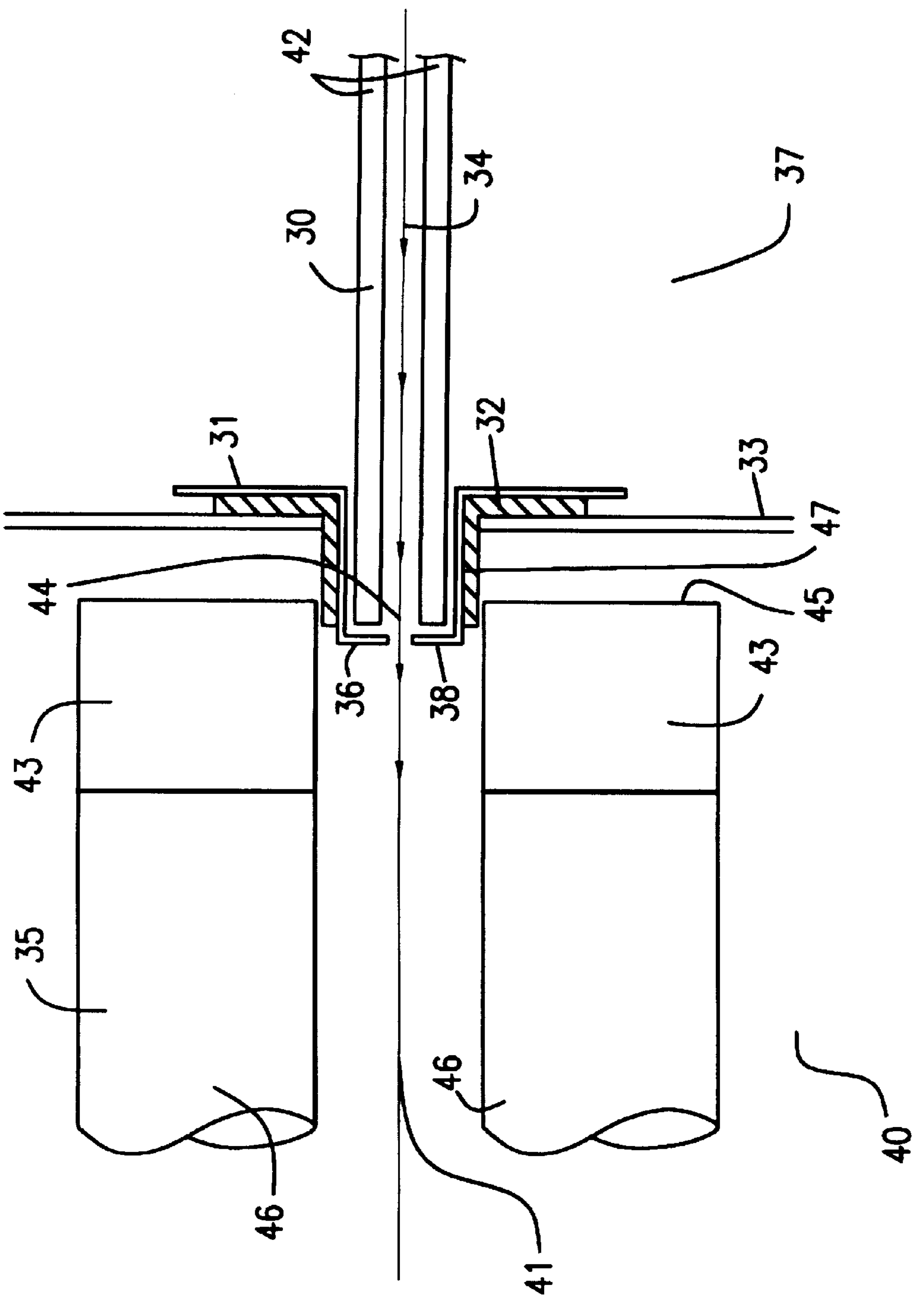
FIG. 2 is a diagram of the quadrupole entrance region with a multipole ion guide assembly extended into the quadrupole analyzer AC only entrance section.
Figure 3:
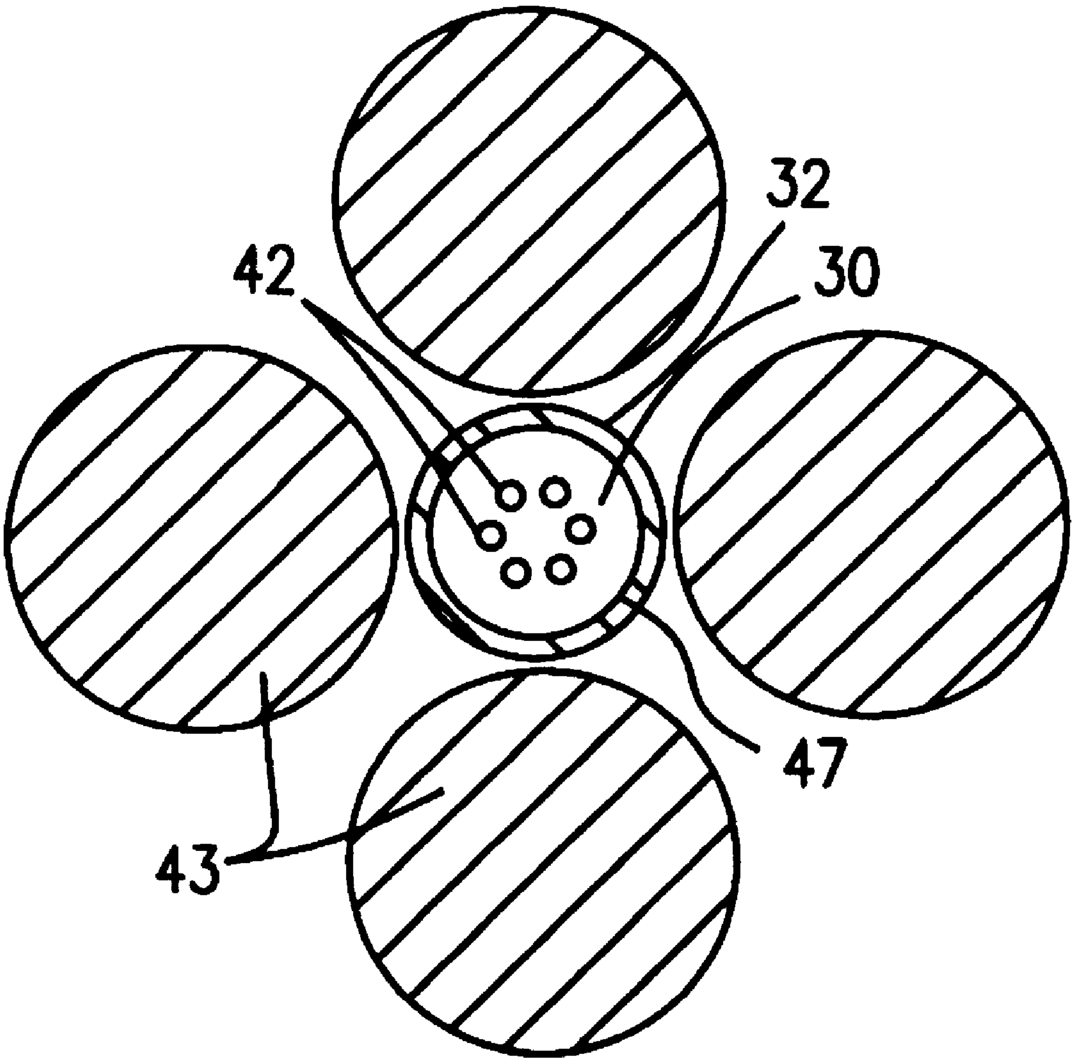
FIG. 3 is an end view cross section diagram of the hexapole ion guide with surrounding exit lens and insulator positioned inside a quadrupole mass analyzer rod assembly.

Schematics of the embodiment of the invention shown in FIG. 1 are given in FIGS. 2 and 3 for clarity. In FIG. 2, poles 42 of ion guide exit end 44 of multipole ion guide 30 are surrounded by hat shaped exit lens 31 which forms a vacuum partition with insulator 32 and vacuum chamber partition 33 between vacuum stages 37 and 40. Exit lens face 36 is located even with or just inside the plane set by the face 45 of quadrupole rods 46 RF sections 43. A cross sectional view looking down the centerline of multipole ion guide 30 is shown in FIG. 3. Quadrupole rod 46 RF sections 43 are positioned around ion guide exit lens 31, hexapole rod assembly 42 of multipole guide 30 and insulator 32. Insulator 32 surrounds exit lens tube section 47 preventing multipole ion guide 30 and exit lens 31 from coming electrically contacting quadrupole rod RF sections 43. In this embodiment, the ion guide 30 centerline is approximately aligned with quadrupole centerline 41. In practice it has been found that the ion guide and quadrupole mass analyzer centerline alignment is not critical to achieve efficient ion transmission into quadrupole 35.

Ions 34 traversing ion guide 30 having m/z values falling within the multipole ion guide operating stability m/z range are trapped radially by the AC and DC voltages applied to guide rods 42 but are free to move in the axial direction. Ions exiting ion guide 30 at exit end 44 pass through exit lens 31 orifice 38 and into quadrupole rod assembly 35. Ions 34 are initially focused to quadrupole 35 centerline 41 by setting the relative potentials of the DC offset of ion guide 30, and exit lens 31 and the DC offset potential of quadrupole 35 AC only section 43. Ions exiting ion guide 30 along centerline 41, where the net quadrupole 35 AC field strength is low, are initially focused toward quadrupole centerline 41 by what is effectively a three element electrostatic lens assembly. The RF applied to the quadrupole RF only section 43 continues to move ions close to centerline 41 whose m/z values are within the stability window. Ion beam 34 exiting exit lens orifice 38 can be focused to a point along the centerline downstream from orifice 38 where the quadrupole 35 RF field can prevent the beam from diverging after the focal point. Ions exiting through exit orifice 38 are initially shielded from the quadrupole RF fringing field defocusing effects by exit lens face 36. As ions move downstream from orifice 38, they are well within the quadrupole rod assembly 35 as the quadrupole RF and DC fields begin to drive the ion trajectories in the radial direction. The embodiment shown in FIGS. 1 and 2 effectively reduces the negative effect of the quadrupole fringing fields for ions transmitted into quadrupole mass analyzer 14 or 35.

Figure 4:
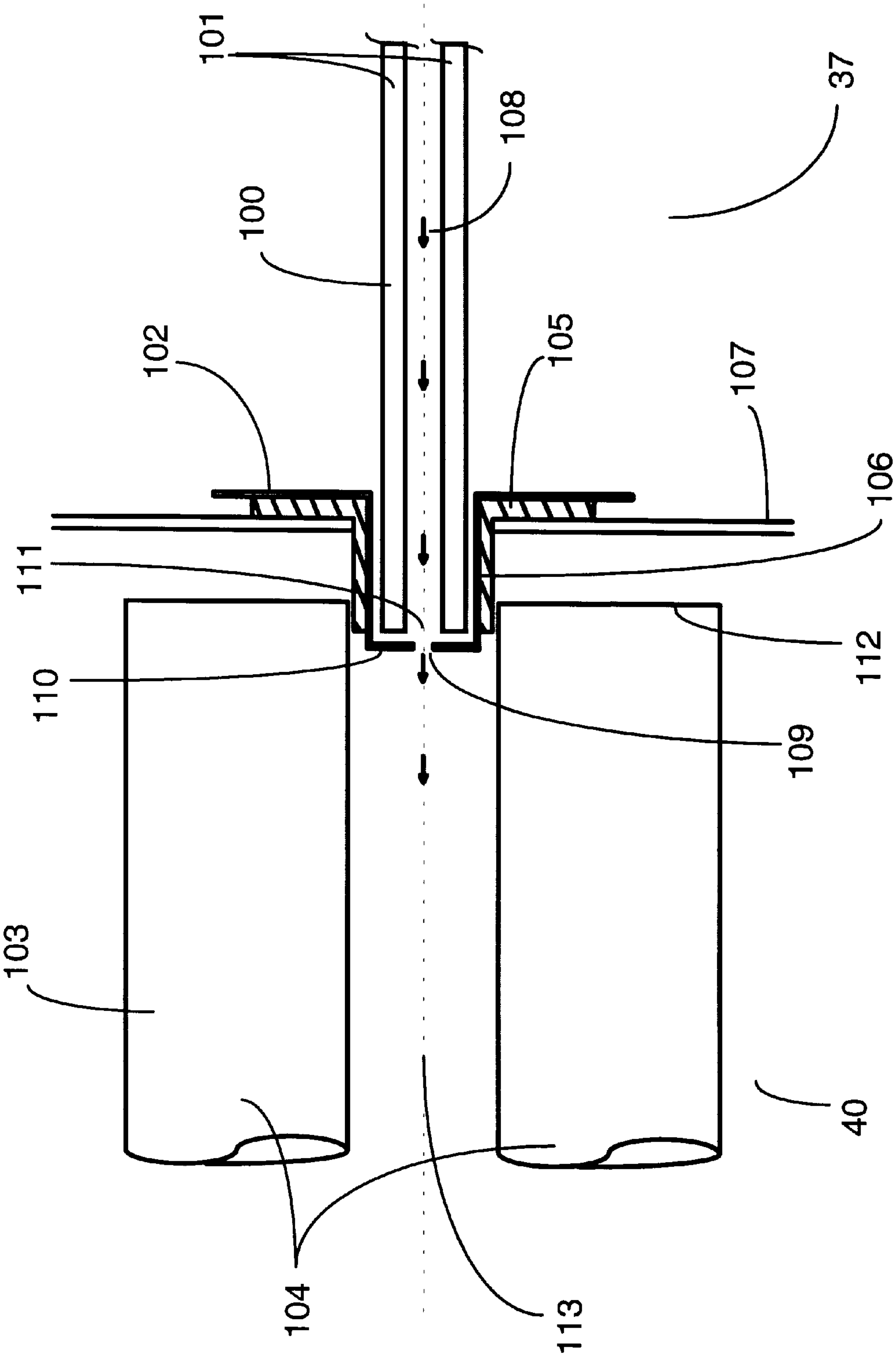
FIG. 4 is a diagram of a quadrupole entrance region having no AC only sections with a multipole ion guide assembly extended into the quadrupole rod assembly.

A wide range of ion beam average ion energies can be efficiently transmitted into quadrupole 14 or 35 with the embodiment shown in FIGS. 1, 2 and 3. Ions with energies as low as 0.1 volts relative to the quadrupole 35 offset voltage have been efficiently transmitted from ion guide 30 into quadrupole ion guide 35. Typically, ion energies of 0.5 to 2.0 volts will be set to achieve maximum sensitivity and resolution with quadrupole 35. It was found that operating with the configuration shown in FIG. 1, the mass resolving power set for quadrupole 14 could be increased over a substantial range with little reduction in ion signal amplitude. The exit lens 31 voltage can be set from a few volts below the offset voltage of ion guide 30 down to 100 volts below said offset voltage depending on the focusing conditions desired. Quadrupole 35 may or may not include AC only pole pieces which form an AC only entrance section 43. The embodiment of the invention shown in FIGS. 1 and 2 can efficiently transmit ions into a quadrupole mass analyzer which incorporates or does not incorporate AC only rod sections at the entrance of the quadrupole. FIG. 4 is a schematic of a multipole ion guide 100 with the rods 101 and hat shaped exit lens 102 extending into quadrupole 103 with rod assembly 104. Insulator 105 surrounds nose portion 106 of exit lens 102 and forms a vacuum seal with vacuum partition 107. Ion beam 108 traversing multipole ion guide 100 exits through exit aperture 109 into quadrupole 103. Multipole ion guide 100 and exit lens face 110 effectively focus the ion beam into quadrupole 103 minimizing the defocusing effects of the quadrupole fringing fields.

Figure 5A:
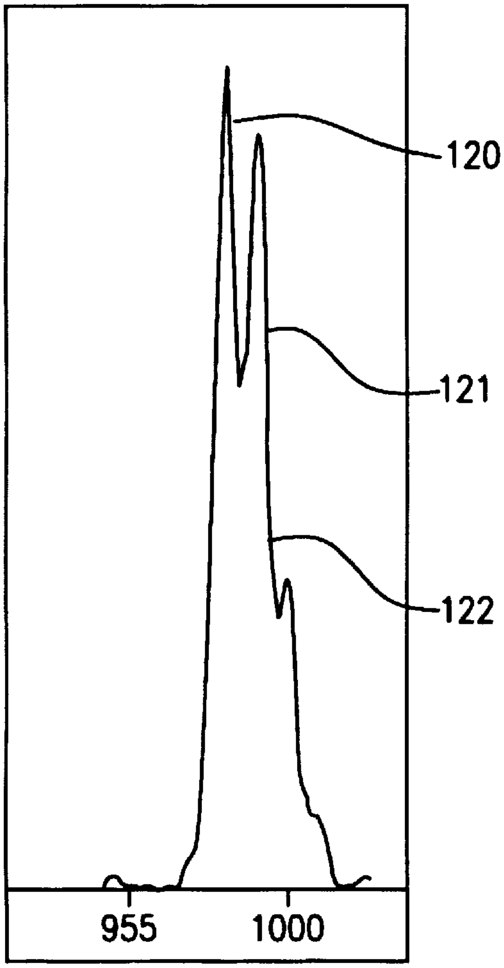
FIGS. 5*a* and 5*b* are mass spectra of singly charged ions of Hexatyrosines.
Figure 5B:
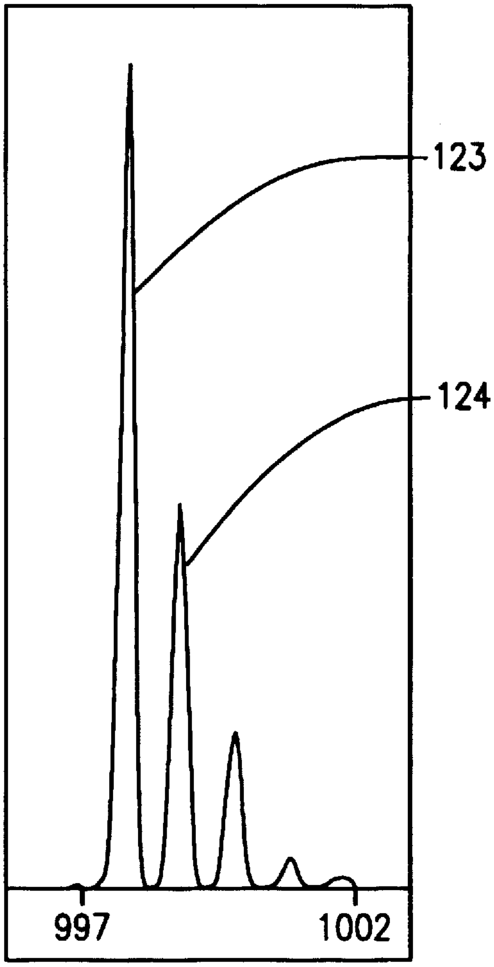

When operating with the ion transfer optics assembly shown in FIGS. 1, 2, 3 and 4, higher resolution and higher sensitivity can be achieved when compared to electrostatic ion transfer and focusing lenses and ion guides which do not extend into the downstream ion guide. FIG. 5*b* shows a mass spectrum of singly charged protonated Hexatyrosine electrosprayed into a quadrupole mass analyzer with the ion transfer optics shown in FIG. 1. FIG. 5*a* is a mass spectrum of singly charged protonated Hexatyrosine electrosprayed using the same Electrospray ion source and quadrupole mass analyzer as was used in acquiring the data in FIG. 5*b*. An electrostatic lens assembly with no multipole ion guide was used to transfer ions from the Electrospray ion source into the quadrupole mass analyzer for the data acquired in FIG. 5*a*. The amplitude of the partially resolved protonated monoisotopic singly charged peak 120 in FIG. 5*a* has an intensity of 9338. The unresolved isotope peak 122 at Full Width Half Mass (FWHM) is 1.73 Daltons wide. Note that the unresolved $C_{13}$ isotope peak 121 in FIG. 5*a* does not have the correct theoretical relative intensity compared to the monoisotopic peak. This relative amplitude error was due to unresolved peak blending. Monoisotopic peak 123 in FIG. 5*b* has an amplitude of 93101, nearly a factor of 10 higher than that of peak 120. The FWHM of peak 123 and 124 is 0.29 Daltons wide and the relative amplitudes of isotope peaks 123 and 124 is close to the predicted theoretical value. The resolution achieved by the quadrupole analyzer for the peaks shown in FIG. 5*b* was actually higher than that recorded. The recorded resolution was reduced by the data system limit in data point density of 20 points per Dalton. Comparing the results in FIGS. 5*a* and 5*b*, the multipole ion guide ion transfer optics shown in FIGS. 1, 2 and 3 improves the sensitivity and the resolution attainable with a quadrupole mass analyzer when compared with that which can be achieved with conventional electrostatic lens transfer ion optics assembly. As shown in the FIGS. 5*a* and 5*b*, the increase in resolution and sensitivity is considerable. Higher resolution is achievable due to the lower ion translational energies which can be transferred into a quadrupole mass analyzer with the embodiment shown in FIGS. 1, 2 and 3.

Ion guide transfer optics from API sources to quadrupole mass analyzers are currently commercially available. One such configuration is, for example, described by Douglas and French in U.S. Pat. No. 4,963,736. Transferring ions from one ion guide to another sequentially, where one ion guide does not extend into the bore of the next, is not as efficient, particularly for ions with low translational energies, as that which can be achieved by operating with the embodiment shown in FIG. 1. Ions are more exposed to the trajectory disrupting and rejection effects of fringing fields when they are transferred from an upstream ion guide which abuts to a downstream ion guide with an electrostatic lens or lenses in between each ion guide. These ions transferred through sequential but separated multipole ion guides are exposed to more pronounced fringing fields when they leave the upstream multipole ion guide and when they attempt to enter the downstream multipole ion guide than they experience in a nested multipole ion guide configuration.

System performance is enhanced when the upstream ion guide begins just at the face or extends into the downstream ion guide to facilitate ion transfer. When this configuration is used to transfer ions into the downstream quadrupole mass analyzer, the resolution performance of the downstream quadrupole ion guide can be increased with little or no decrease in sensitivity. For the configuration shown in FIG. 2 or 4, the ion guide 30 or 100 can be used to trap and hold ions by raising the voltage on exit lens 31 or 102. The AC and DC voltages applied to ion guide 30 can also be set to limit the m/z range of ions which can traverse the ion guide length either during trapping or in the ion transmission mode. Generally, higher m/z selection resolving power can be achieved with quadrupoles compared to hexapoles or octapole. With ion guide 30 configured as quadrupole, narrow m/z range selection can be achieved prior to the downstream multipole ion guide or additional quadrupole mass analyzer 35. If the background pressure in multipole ion guide 35 is increased or the neutral gas pressure is increased along a portion of the length of ion guide 30, CID fragmentation can occur within multipole ion guide 30 or 35. CID fragmentation within ion guide 30 can be achieved by applying an AC excitation voltage to rods 42 of multipole ion guide 30 whose frequency or frequencies corresponds to the resonant excitation frequencies of the ions selected for fragmentation. Ion m/z values whose trajectories are accelerated in the radial direction by the resonant excitation frequencies, collide with background gas which leads to Collisionally Induced Dissociation within multipole ion guide 30. In this manner, multipole ion guide 30 can be operated in a mass selective and CID fragmentation mode and even a trapping mode prior to transferring ions to the downstream multipole ion guide or mass analyzer 35. Consequently, ion guide 30 and 35 combined can be used to achieve MS/MS analysis provided the background pressure in ion guide 30 is sufficient to cause CID fragmentation of ions as they traverse the ion guide length.

In another embodiment, ion guide 30 can be configured as the first analytical quadrupole and ion guide 35 as the CID AC only ion guide in a mass analyzer with MS/MS capability. In this embodiment, it would be required to set the background pressure in multipole ion guide 35 sufficiently high to enable CID fragmentation of ions accelerated into multipole ion guide 35. The embodiment of the invention as shown in FIGS. 1, 2 and 4 can also be configured such that both ion guides 30 and 35 are located in the same vacuum pumping stage. This would typically be the case in a multipole ion guide configuration where m/z selection is followed by a CID section followed by m/z selection. Configured with a chamber that surrounds the second multipole ion guide, the local background pressure in the second multipole ion guide can be maintained at a level to achieve efficient CID conditions. In commercially available "triple quadrupoles", generally all three ion guides of an MS/MS analyzer reside in the same vacuum stage.

Figure 6:
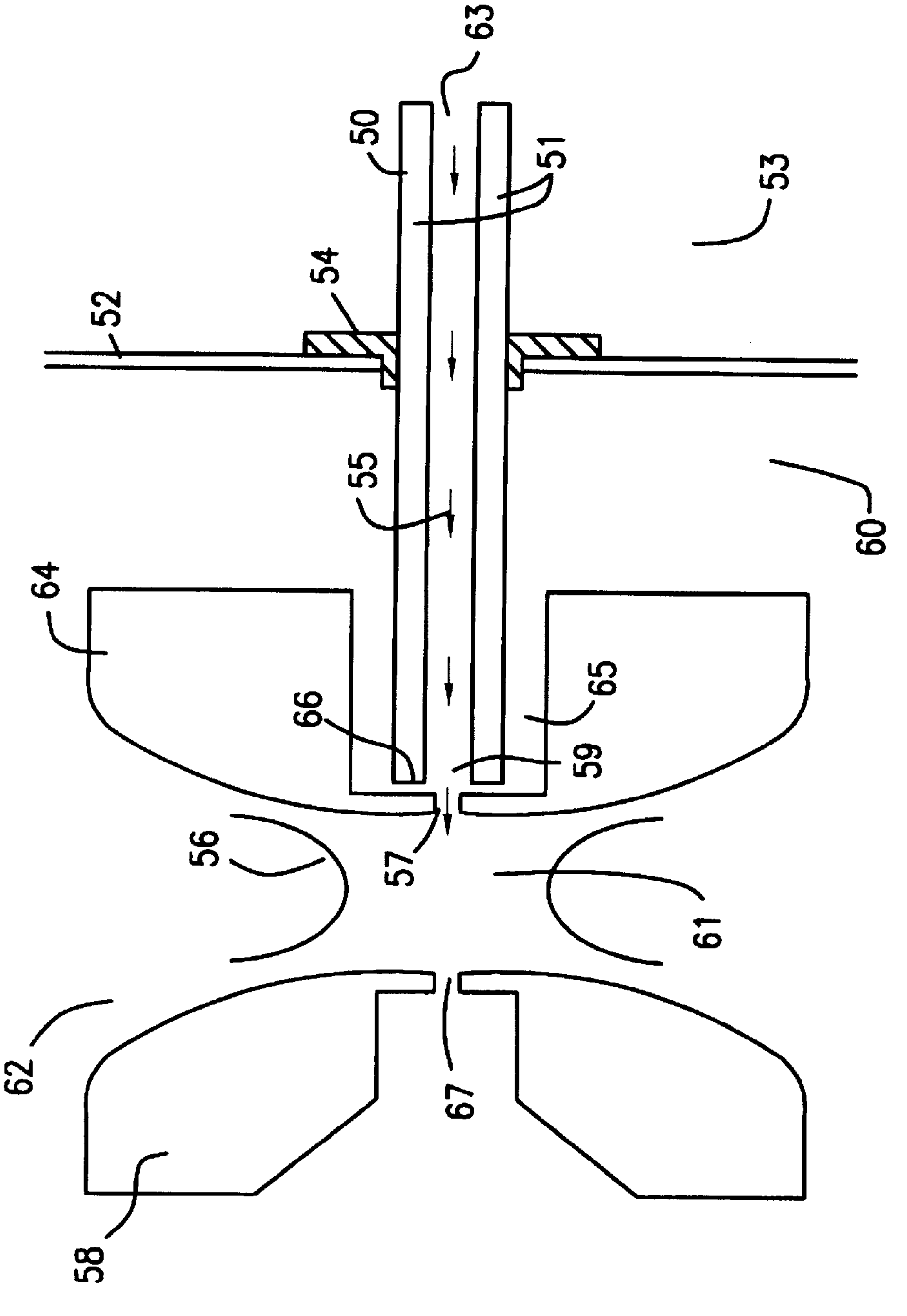
FIG. 6 is a diagram of a multipole ion guide configured such that the ion guide exit lens is the entrance endcap of a three dimensional ion trap mass analyzer.

An alternative embodiment of the invention can be configured to improve the transmission efficiency of ions from a multipole ion guide into a three dimensional quadrupole ion trap mass analyzer and allow the recapture of ions ejected from the three dimensional ion trap. This alternative embodiment of the invention is shown in FIG. 6. Multipole ion guide 50 is configured to have a smaller radial dimension and is positioned to extend into counterbore 65 in three dimensional quadrupole ion trap 62 endcap or endplate 64. In the embodiment shown, multipole ion guide 50 extends continuously into multiple vacuum stages. Ion guide 50 could also be configured to reside entirely in one vacuum pumping stage. Alternatively, the three dimensional ion trap 62 endcap or endplate 64 can be configured as a vacuum stage partition with multipole ion guide 50 and ion trap 62 residing in different vacuum pumping stages. Ion guide 50 can also be configured to reside in the same vacuum pumping stage as ion trap 62. Commercially available three dimensional ion traps generally have ring and endplate electrode configurations whose dimensions differ from that which would produce purely quadrupole fields. The distorted ion trap electrode shapes create non-quadrupole electric field components within the ion trap. For convenience in this discussion such three dimensional "quadrupole" ion traps will be generically referred to as three dimension ion traps.

Referring to FIG. 6, ion guide 50 extends continuously from vacuum stage 53 into vacuum stage 60 through the vacuum chamber partition 52 and insulator 54. Voltages are applied to multipole ion guide 50 poles 51 to establish stable ion transmission for large or narrow ranges of m/z or to trap ions in the multipole ion guide before transferring said ions into the three dimensional ion trap 62. In the embodiment of the invention shown in FIG. 6, ion trap 62 entrance end cap 64 is bored from the outside surface with bore 65 (also referred to herein as a "counterbore") terminating in ion trap entrance aperture 57. Exit end 59 of ion guide 50 is positioned to extend into counterbore 65 of entrance endcap 64. Exit end 66 of ion guide rods 51 are positioned in bored hole 65 such that the bottom of bore 65 with aperture 57 serves as the exit lens for ion guide 50. Ions exiting ion guide 50 pass through the ion trap entrance aperture 57 and move into ion trap 62 during a portion of the AC waveform cycle resulting from the AC voltage applied to ring electrode 56. The AC or RF voltage applied to ion trap ring electrode 56 during operation creates varying electric fields at entrance aperture 57 which enable ions to enter region 61 of ion trap 62, reject ions attempting to enter or modify the ion trajectories in a manner that will prevent the effective trapping of the ions by ion trap 62. The ion polarity, ion kinetic energy, the RF amplitude phase of the electric field and the ion trap endcap potentials will determine whether an ion can enter ion trap 62 and be successfully trapped. The embodiment shown in FIG. 6 allows a portion of the ions which are rejected from ion trap 62 during the ion trap fill period to be recaptured in multipole ion guide 50. These ions retrapped by multipole ion guide 50 can subsequently be reinjected into ion trap 62. During the scan or mass analysis step of ion trap 62, ions must be rejected from the ion trap 62 to be detected. To detect ions trapped in ion trap 62, the ions must be driven into an unstable trajectory so they will be ejected from the ion trap through the endcap orifices 57 and 67. Ions exiting through exit aperture 67 in exit endcap 58 are detected by a detector appropriately positioned to detect these ions. Ions which are simultaneously ejected through entrance aperture 57 of endcap 64 can be recaptured in multipole ion guide 50. All or a portion of these recaptured ions can then be transferred back into region 61 of ion trap 62 during the next appropriate fill cycle. Ions which are retrapped in multipole ion guide 50 are not lost during a fill and scan cycle. This method where ions ejected through or rejected from ion trap entrance aperture 57 are retrapped in multipole ion guide 50 can be used to improve overall duty cycle and hence sensitivity of mass analysis with three dimensional ion traps.

Ion trap 62 with entrance end cap 64, exit end cap 58 and ring electrode 56 can be operated as a mass analyzer or as an ion trap with ion pulsing into a time-of-flight mass analyzer. The invention configures aperture 57 with the dual role of ion guide exit lens and ion trap endplate entrance aperture. The focusing of the ion beam entering the ion trap is established by optimizing the relative DC end caps 64 and 58 voltages with ion guide 50 DC offset potential and the ion kinetic energy. Low energy ions can be efficiently transferred into the ion trap, effectively increasing the trapping efficiency of these transferred ions particularly for ions of higher m/z values. Increased ion trap 62 trapping efficiency directly results in higher sensitivity. Higher dynamic range can be achieved in the trap if multipole ion guide 50 is operated in a manner which reduces the m/z range of ions which are transferred to ion trap 62. Unwanted ion m/z values such as low m/z contamination ions can be prevented from filling the trap while the ions of interest located in a different portion of the m/z scale can be transmitted into ion trap 62 for mass analysis. The offset potential of ion guide 50 can be lowered relative to the endplate 64 voltage, trapping ions in the ion guide during the time period where ion trap 62 is conducting a mass analysis. When ion trap 62 has completed its analysis, the multipole ion guide 50 offset potential can be increased relative to the endplate 64 voltage, allowing ions to pass from multipole ion guide 50 into three dimensional ion trap 62. For example if the kinetic energy of positive ions is 2 volts, the DC potential applied to endcap 64 must be greater than 2 volts higher than the ion guide 50 offset potential to trap the positive ions within multipole ion guide 50.

Alternatively, three dimensional ion trap 50 can be operated such that ion trap 62 RF, resonant AC potentials and end cap DC potentials are set relative to the ion guide 50 DC offset potential to allow ions to pass from volume 61 of ion trap 62 into multipole ion guide 50. In this manner, a portion of the ions rejected from ion trap 62, for example in an MS/MS experiment, can be recaptured by multipole ion guide 50 and transferred back into ion trap 62 for a subsequent analysis. This method of transferring ions back into multipole ion guide 50 may also be employed to achieve higher energy CID conditions by accelerating selected ions trapped in ion trap 62 back into multipole ion guide 50. Ions which re-enter multipole ion guide 50 in reverse through exit end 59 travel toward entrance end 63 where they can collide with neutral gas molecules in the increased background gas pressure region near ion guide entrance end 63. As shown in FIG. 1, if the ion guide entrance were positioned downstream of a skimmer in an API source, the pressure at the ion guide entrance can be in excess of $10^{-2}$ torr. Ions with sufficient kinetic energy colliding with neutral gas molecules in the elevated pressure regions near entrance 63 of ion guide 50 would experience Collisional Induced Dissociation. The resulting fragment ions trapped in multipole ion guide 50 could then be transferred back into ion trap 62 for analysis. The transfer of ions from ion trap 62 to multipole ion guide 50 can also be a means of saving ions if ion trap 62 is overloaded and ions must be released to avoid space charge effects during mass analysis.

Figure 7:
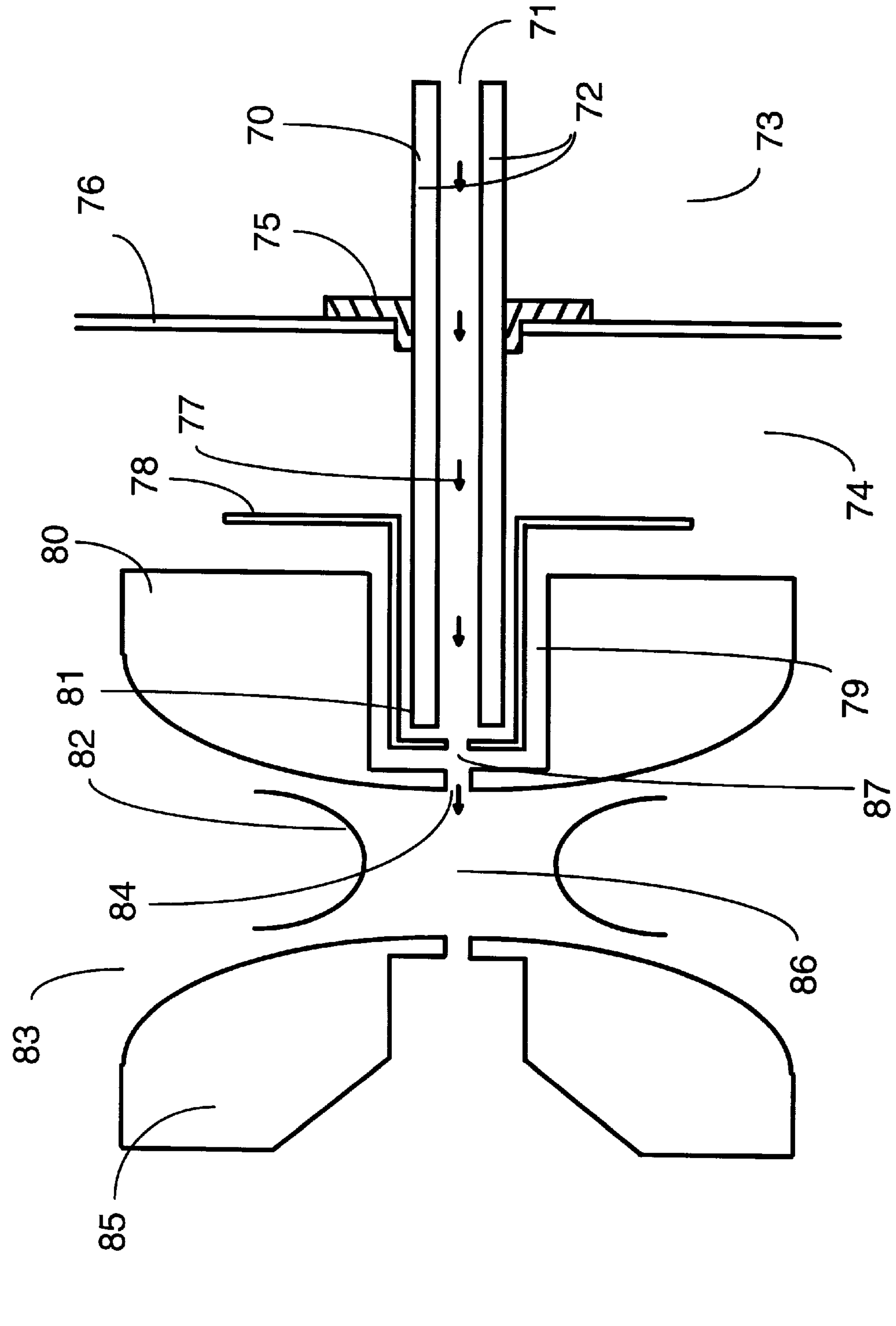
FIG. 7 is a diagram of a multipole ion guide configured such that the ion guide and its exit lens extends into the counter bore of a three dimensional ion trap endcap lens.

An alternative embodiment of the invention is diagrammed in FIG. 7. In this embodiment, exit lens 78 has been positioned between ion guide 70 exit end 81 and ion trap 83 end cap aperture 84. Hat shaped exit lens 78 is positioned to extend into an ion trap 83 end cap counterbore 79 such that exit lens 78 aperture 87 is axially aligned with end cap aperture 84 and the axis of multipole ion guide 70. Ions 77 traveling through multipole ion guide 70 exit through exit lens 78 at aperture 87 and are focused through endplate 80 aperture 84 into the ion trap 83 volume 86. Ion trap 83, consisting of endcap electrodes 85 and 80 and ring electrode 82, traps ions transferred from multipole ion guide 70 for mass analysis and/or fragmentation. Ion guide 70 is shown to extend continuously from vacuum stage 73 into vacuum stage 74 through vacuum partition 76 and insulator 75.

Alternatively, multipole ion guide 70 and ion trap 83 can be configured to reside in separate vacuum stages or in a single vacuum stage.

The addition of exit lens 78 allows for improved focusing or shaping of the ion beam consisting of ions either leaving multipole ion guide 70 at exit end 81 or ions re-entering multipole ion guide 70 from ion trap 83 in the reverse direction through multipole ion guide exit end 81. The ion beam exiting ion guide 70 can be focused or shaped by setting the appropriate relative voltages on exit lens 78, ion trap endcap electrodes 80 and 85, ring electrode (i.e. lens) 82 and the multipole ion guide rods 72. The addition of lens 78 allows flexibility in ion beam shaping with the appropriate voltage settings yet retains an efficient means of transferring ions from multipole ion guide 70 into an ion trap 83. By positioning end 81 of ion guide 70 inside the counterbore 79 of end cap 80 close to aperture 84, lower ion energies can be delivered to the ion trap with higher efficiencies. This results in higher sensitivity and more uniform trapping efficiencies over a larger range of m/z values. The voltage applied to hat shaped lens 78 can also be adjusted to trap ions in multipole ion guide 70 independent from the potentials applied to ion trap endcaps 80 and 85. Hence three dimensional ion trap trapping, ion fragmentation and mass analysis functions which involve changing AC and/or DC potentials on endcaps 80 and 85, can be run independently from the potentials applied to ion guide exit lens 78 and ion guide 70. The various ion transfer functions from ion guide 70 to ion trap 83 and from ion trap 83 to ion guide 70 described for the embodiment shown in FIG. 6 can also be realized with the embodiment shown in FIG. 7. The embodiment in FIG. 7 allows additional flexibility in relative voltage settings between the ion trap 83 and ion guide 70. This is due to the ability to set the potential on exit lens 78 separately from the potentials set on ion trap endplates 80 and 85 and ring electrode 82 and ion guide rods 72.

Having described this invention with regard to specific embodiments, it is to be understood that the description is not meant as a limitation since further modifications or variations thereon may suggest themselves or may be apparent to those skilled in the art. It is intended that the present application cover all such modifications and variations as fall within the scope of the appended claims.

We claim:

1. An apparatus, comprising:

a first multipole ion guide having a first set of poles; and, a second multipole ion guide;

and wherein said first multipole ion guide and said second multipole ion guide are configured such that said first multipole ion guide extends into said second multipole ion guide, such that a portion of said first set of poles is located within said second multipole ion guide.

2. A mass spectrometer apparatus, comprising:

(a) a first multipole ion guide comprising a first set of poles;

(b) a second multipole ion guide comprising a second set of poles, said second set of poles defining a volume within said second set of poles, and wherein said first set of poles extends into said volume; and, (c) means for applying voltages to said first multipole ion guide and to said second multipole ion guide.

3. An apparatus as claimed in claim 2, wherein said first set of poles are symmetrically spaced parallel poles.

4. An apparatus as claimed in claim 2, wherein said second set of poles are symmetrically spaced parallel poles.

5. An apparatus as claimed in claim 2, wherein said first multipole ion guide comprises a quadrupole.

6. An apparatus as claimed in claim 2, wherein said first multipole ion guide comprises a hexapole.

7. An apparatus as claimed in claim 2, wherein said first multipole ion guide comprises more than six poles.

8. An apparatus as claimed in claim 2, wherein said second multipole ion guide comprises a quadrupole.

9. An apparatus as claimed in claim 2, wherein said second multipole ion guide comprises a hexapole.

10. An apparatus as claimed in claim 2, wherein said second multipole ion guide comprises more than six poles.

11. An apparatus as claimed in claim 2, wherein said apparatus comprises multiple vacuum stages, and wherein at least one of said multipole ion guides extends through said multiple vacuum stages.

12. An apparatus as claimed in claim 2, wherein said apparatus comprises multiple vacuum stages, and wherein at least one of said multipole ion guides is located entirely within one of said multiple vacuum stages.

13. An apparatus as claimed in claim 2, wherein said apparatus comprises multiple vacuum stages, and wherein said first multipole ion guide extends through said multiple vacuum stages.

14. An apparatus as claimed in claim 2, wherein said apparatus comprises multiple vacuum stages, and wherein said first multipole ion guide is located entirely within one of said multiple vacuum stages.

15. An apparatus as claimed in claim 2, wherein said apparatus comprises multiple vacuum stages, and wherein said first multipole ion guide and said second multipole ion guide are located within different vacuum stages.

16. An apparatus as claimed in claim 2, wherein said apparatus comprises multiple vacuum stages, and wherein said first multipole ion guide and said second multipole ion guide are located within the same vacuum stage.

17. An apparatus as claimed in claim 2, wherein said first multipole ion guide comprises a first centerline, and said second multipole ion guide comprises a second centerline, and wherein said first centerline and said second centerline are approximately aligned.

18. An apparatus as claimed in claim 2, wherein at least one of said multipole ion guides transfers ions into a mass analyzer.

19. An apparatus as claimed in claim 2, wherein said second multipole ion guide is part of a mass analyzer.

20. An apparatus as claimed in claim 2, wherein said means for applying voltages comprises means for applying AC voltages.

21. An apparatus as claimed in claim 2, wherein said means for applying voltages comprises means for applying DC voltages.

22. An apparatus as claimed in claim 2, wherein said means for applying voltages comprises means for applying AC and DC voltages.

23. An apparatus as claimed in claim 2, further comprising gas within at least one of said first multipole ion guide and said second multipole ion guide.

24. An apparatus as claimed in claim 23, wherein said gas has a gas pressure which is high enough to cause collisional damping of ions trapped within said at least one multipole ion guide.

25. An apparatus comprising:

(a) a first multipole ion guide having a first set of poles and an exit end;

(b) a electrostatic lens positioned at said exit end of said first multipole ion guide;

(c) a second multipole ion guide comprising a second set of poles and an entrance end, said second set of poles being parallel and being symmetrically positioned around a common center of said second set of poles, said second set of poles comprising an entrance end, said second set of poles defining a volume inside said second set of poles, and wherein said electrostatic lens extends into said volume; and, (d) means for applying different potentials to said first set of poles, to said second set of poles, and to said electrostatic lens.

26. An apparatus as claimed in claim 25, wherein said electrostatic lens extends slightly into said volume, such that an end of said electrostatic lens is configured even with said entrance end.

27. An apparatus as claimed in claim 25, wherein said second multipole ion guide is a quadrupole.

28. An apparatus as claimed in claim 25, wherein said means for applying different potentials includes means to operate said second multipole ion guide as a mass to charge filter.

29. An apparatus as claimed in claim 25, wherein said means to applying different potentials includes means for operating said first multipole ion guide as a mass to charge filter.

30. An apparatus as claimed in claim 25, wherein said means for applying different potentials includes means for operating at least one of said multipole ion guide as a mass to charge filter.

31. An apparatus as claimed in claim 25, wherein said means for applying different potentials includes means for operating said first multipole ion guide in ion trapping mode.

32. An apparatus as claimed in claim 25, wherein said means for applying different potentials includes means for causing ion fragmentation in said first multipole ion guide.

33. An apparatus as claimed in claim 25, wherein said apparatus comprises multiple vacuum pumping stages and wherein said first multipole ion guide extends continuously into said multiple vacuum pumping stages.

34. An apparatus as claimed in claim 25, wherein said means for applying different potentials comprises means for applying resonant AC waveforms to said first multipole ion guide to cause ion resonant frequency excitation collisional induced dissociation of selected ions in said first multiple ion guide.

35. An apparatus as claimed in claim 25, wherein said electrostatic lens is hat-shaped.

36. An apparatus as claimed in claim 25, wherein said apparatus further comprises electrically insulating material around at least a portion of said electrostatic lens.

37. An apparatus as claimed in claim 36, wherein said electrically insulating material comprises a ceramic insulator.

38. An apparatus as claimed in claim 25, wherein said electrostatic lens comprises a tube shaped section.

39. An apparatus as claimed in claim 38, wherein said apparatus comprises electrically insulating material around said tube shaped section.

40. An apparatus as claimed in claim 25, wherein said electrostatic lens comprises a nose section.

41. An apparatus as claimed in claim 40, wherein said apparatus comprises electrically insulating material around said nose section.

42. An apparatus as claimed in claim 25, wherein said second multipole ion guide further comprises an AC only entrance section.

43. A method for transfer of ions from a first multipole ion guide into a second multipole ion guide comprising the steps of:

(a) providing a first multipole ion guide comprising a first set of poles and an exit end;

(b) providing a second multipole ion guide comprising a second set of poles, said second set of poles being parallel and symmetrically positioned around a common center of said second set of poles, said second set of poles defining a volume inside said second set of poles, and wherein said first multipole ion guide is extends into said volume of said second multipole ion guide;

(b) providing means for applying potentials to said first set of poles and said second set of poles;

(c) setting the value of said potentials applied to said first set of poles and said second set of poles to allow the transfer of ions from said first multipole ion guide into said second multipole ion guide.

44. A method according to claim 43, wherein said second multipole ion guide is operated as a mass to charge filter.

45. A method according to claim 43, wherein said first multipole ion guide is operated as a mass to charge filter.

46. A method according to claim 43, wherein said second multipole ion guide is operated in ion trapping mode.

47. A method according to claim 43, wherein said at least one said multipole ion guide is operated as a mass to charge filter.

48. A method according to claim 43, wherein said first multipole ion guide is operated in ion fragmentation mode.

49. A method for transfer of ions from a first multipole ion guide into a second multipole ion guide comprising the steps of:

(a) providing a first multipole ion guide comprising a first set of poles and an exit end;

(b) providing an electrostatic lens positioned at said exit end of said first multipole ion guide;

(c) providing a second multipole ion guide comprising a second set of poles, said second set of poles being parallel and symmetrically positioned around a common center of said second set of poles, said second set of poles defining a volume inside said second set of poles and comprising an entrance end, wherein said electrostatic lens extends into said volume of said second multipole ion guide;

(d) providing means to apply potentials to said first set of poles, said second set of poles and said electrostatic lens;

(e) setting the value of said potentials applied to said first set of poles, said second set of poles and said electrostatic lens to allow the transfer of ions from said first multipole ion guide into said second multipole ion guide.

50. A method according to claim 48, wherein said second multipole ion guide is operated as a mass to charge filter.

51. A method according to claim 48, wherein said first multipole ion guide is operated as a mass to charge filter.

52. A method according to claim 48, wherein said second multipole ion guide is operated in ion trapping mode.

53. A method according to claim 48, wherein said at least one said multipole ion guide is operated as a mass to charge filter.

54. A method according to claim 48, wherein said first multipole ion guide is operated in ion fragmentation mode.

* * * * *